United States Patent
Chaudhuri

(10) Patent No.: US 7,142,505 B2
(45) Date of Patent: *Nov. 28, 2006

(54) METHOD AND APPARATUS FOR RESTORING A NETWORK

(75) Inventor: Sid Chaudhuri, East Brunswick, NJ (US)

(73) Assignee: AT&T Corp., New York, NY (US)

( * ) Notice: Subject to any disclaimer, the term of this patent is extended or adjusted under 35 U.S.C. 154(b) by 531 days.

This patent is subject to a terminal disclaimer.

(21) Appl. No.: 10/629,458

(22) Filed: Jul. 29, 2003

(65) Prior Publication Data

US 2004/0073700 A1    Apr. 15, 2004

(51) Int. Cl.
*H04J 1/16* (2006.01)

(52) U.S. Cl. ........................ 370/225; 370/228
(58) Field of Classification Search ............... None
See application file for complete search history.

(56) References Cited

U.S. PATENT DOCUMENTS

| | | | | |
|---|---|---|---|---|
| 5,029,333 A * | 7/1991 | Graves et al. | ............ | 370/490 |
| 5,146,452 A * | 9/1992 | Pekarske | ............ | 370/228 |
| 5,233,600 A * | 8/1993 | Pekarske | ............ | 370/228 |
| 5,457,556 A * | 10/1995 | Shiragaki | ............ | 398/50 |
| 5,548,639 A * | 8/1996 | Ogura et al. | ............ | 379/221.04 |
| 5,600,631 A * | 2/1997 | Takatori et al. | ............ | 370/217 |
| 5,636,203 A * | 6/1997 | Shah | ............ | 370/244 |
| 5,818,816 A * | 10/1998 | Chikazawa et al. | ............ | 370/225 |
| 6,031,819 A * | 2/2000 | Croslin | ............ | 370/217 |
| 6,130,876 A * | 10/2000 | Chaudhuri | ............ | 370/228 |
| 6,154,448 A * | 11/2000 | Petersen et al. | ............ | 370/248 |
| 6,411,598 B1 * | 6/2002 | McGlade | ............ | 370/217 |
| 6,430,150 B1 * | 8/2002 | Azuma et al. | ............ | 370/218 |
| 6,600,719 B1 * | 7/2003 | Chaudhuri | ............ | 370/228 |

* cited by examiner

*Primary Examiner*—Andrew C. Lee
(74) *Attorney, Agent, or Firm*—Michael Haynes PLC; Michael N. Haynes

(57) ABSTRACT

A method and apparatus for restoring communications in a network. The network includes a plurality of nodes, with each pair of nodes connected by a link, and with each link having information channels and restoration channels. An idle signal is sent on each restoration channel for each link. The failure of a link is detected, with the failed link connecting an originating node with a terminating node. In addition, the failed link includes at least one information channel carrying information signals. An alternate path through the network is determined for the information signals using restoration and idle signals sent over the restoration channels. The information signals are then routed from the originating node to the terminating node in accordance with the alternate path.

11 Claims, 5 Drawing Sheets

METHOD AND APPARATUS FOR RESTORING A NETWORK

CROSS-REFERENCES TO RELATED APPLICATIONS

This application claims priority to, and incorporates by reference herein in its entirety, U.S. patent application Ser. No. 09/477,595 filed on Jan. 4, 2000 which issued as U.S. Pat. No. 6,600,719 on 29 Jul. 2003, and U.S. patent application Ser. No. 08/936,369 filed on Sep. 24, 1997 which issued as U.S. Pat. No. 6,130,876 on 10 Oct. 2000.

FIELD OF THE INVENTION

The invention relates to network restoration techniques in general. More particularly, the invention relates to a method and apparatus for restoring network communications when a node or link of the network fails.

BACKGROUND OF THE INVENTION

It is a fairly accepted truism that communications is the lifeblood of business. As domestic and international businesses continue to expand at an extrodinary pace, these businesses become increasingly reliant upon telecommunications services to remain competitive in a global marketplace. Whether it is talking to a customer over the Public Switched Telephone Network (PSTN), sending an electronic mail message over the Internet, or trading product specifications over a local area network, disruptions to a communications network can mean significant losses to a business. Extended outages are particularly harmful, but even brief outages can be bothersome. The result is ever increasing demands by telecommunications customers for a virtually uninterruptible network.

One element to creating a virtually uninterruptible network is to correct network outages as rapidly as they occur. At a very high level, a network can be viewed as a pattern of communications nodes interconnected by communications links. The communications nodes can include electronic or optical cross-connects ("switches"), personal computers, servers, printers, or any other type of network device. The communications links include some type of media for transporting communications signals, such as optical fiber, twisted-pair copper wires, co-axial cable, radio frequencies, and so forth. An example of a communications network would be a set of communications switches ("switching fabric") connected together by optical fibers ("optical links"). If an optical link is damaged, as frequently occurs such as when a construction company digs in the area where the optical link is buried, the communications signals carried by the optical link must be quickly re-routed. This is also true if a switching fabric becomes inoperable, although the problem of re-routing the communications signals becomes an even greater challenge in this case.

Several conventional techniques have been developed to restore communications in the event of a link or node failure on a network. These techniques are loosely referred to as "network restoration techniques" and in most cases refer to an algorithm for re-routing the communications signals carried by the failed link, or switched by the inoperative node. For example, a class of algorithms have been developed that are referred to as "flooding algorithms." Communication messages for service restoration in case of a failure in the network are transmitted through links between the switches. The switches then electronically process these messages to take appropriate action to restore the failed traffic in the event of, for example, a link failure.

There are basically two types of flooding algorithms for restoring the failed traffic in the event of a link failure. The first is referred to as "link based restoration," while the second is referred to as "path-based restoration. Path based restoration attempts to re-route failed circuits between the originating node and destination node of the individual circuits in the failed link. By way of contrast, link based restoration attempts to re-route all traffic around the failed link regardless of the origination and destination of the bearer traffic on the failed link.

Link based restoration and path based restoration each have their advantages and disadvantages. For example, link based restoration is typically faster than path based restoration, but is less efficient in terms of restoration capacity utilization. Conversely, path based restoration is slower than link based restoration, but utilizes restoration resources more efficiently since the origination and destination nodes of the failed nodes are typically distributed throughout the system.

These techniques, however, are unsatisfactory for a number of reasons. For example, a completely optical layer network above the Synchronous Optical Network (SONET) layer is fast becoming a reality. The optical network is being driven both by the commercial availability of dense wavelength division multiplex (DWDM) technology and the continuing growth of traffic. Current DWDM systems are offering sixteen or more OC-48 channels on a pair of fibers. In the future it may grow to more than one hundred wavelengths, and the channel capacity may increase to at least 10 Gigabytes per second (Gbps). When a substantial number of links are deployed in the network, it will be necessary to manage the network at the optical layer. This management will require the capability to restore the network in the optical layer. Networking and restoration at the optical layer is highly desirable for optical switching systems. No signal will undergo optical to electrical conversion at these optical cross-connect systems. Therefore, restoration from a failure in the network will either require communication and processing messages between the optical cross-connect systems in the optical domain or an auxiliary optical channel which will undergo optical to electrical conversion and processing just for messaging. It is desirable to eliminate the need of an auxiliary channel for the purpose of restoration. Even if it is required for other purposes, it is extremely important that the processing required at each node remains simple for implementing a fast restoration technique in an optical network. Conventional network restoration techniques fail to address any of these concerns, and are not designed to perform network restoration in the optical domain.

In view of the foregoing, it can be appreciated that a substantial needs exists for a method and apparatus for providing fast restoration from a link or a node failure in a network, that solves the above-discussed problems.

SUMMARY OF THE INVENTION

The present invention includes a method and apparatus for restoring communications in a network. The network includes a plurality of nodes, with each pair of nodes connected by a link, and with each link having information channels and restoration channels. An idle signal is sent on each restoration channel for each link. The failure of a link is detected, with the failed link connecting an originating node with a terminating node. In addition, the failed link includes at least one information channel carrying information signals. An alternate path through the network is determined for the information signals using restoration and idle signals sent over the restoration channels. The information signals are then routed from the originating node to the terminating node in accordance with the alternate path.

With these and other advantages and features of the invention that will become hereinafter apparent, the nature of the invention may be more clearly understood by reference to the following detailed description of the invention, the appended claims and to the several drawings attached herein.

DETAILED DESCRIPTION

The present invention includes a method and apparatus for optical network restoration. One embodiment of the invention is link based and comprises an automatically computed shortest route restoration algorithm. It does not require a sender and chooser node identification or band width requirement messages. It works from both ends simultaneously and therefore, the restoration is fast for link failure. This embodiment of the invention is also applicable for a node failure in the network. It includes an in-band restoration algorithm which does not require any extra channel or any overhead (as in SONET) and therefore is optimal for an optical network restoration. The in-band messaging and restoration method achieves fast restoration comparable to a SONET ring restoration and yet with less network restoration capacity.

Figure 1:
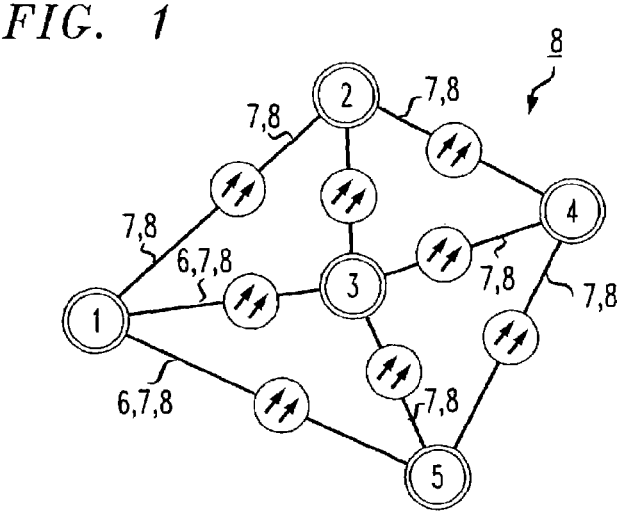
FIG. 1 illustrates a network suitable for practicing one embodiment of the present invention.

Referring now in detail to the drawings wherein like parts are designated by like reference numerals throughout, there is illustrated in FIG. 1 a network suitable for practicing one embodiment of the present invention. FIG. 1 shows an optical network 8 comprising multiple nodes labeled 1–5 connected by DWM optical links. It is assumed that optical network 8 is OC-48 based, i.e., each operating channel in each DWDM optical link is carrying an OC-48 signal. In this embodiment of the invention, there is an optical cross-connect system in each node. It can be appreciated, however, that electrical cross-connects can be used and still fall within the scope of the invention. In such a case, each node would be equipped with electrical to optical (O/E) and E/O converters, and the appropriate signaling across said O/E and E/O converters will have to be implemented in accordance with the principles described herein.

Figure 2:
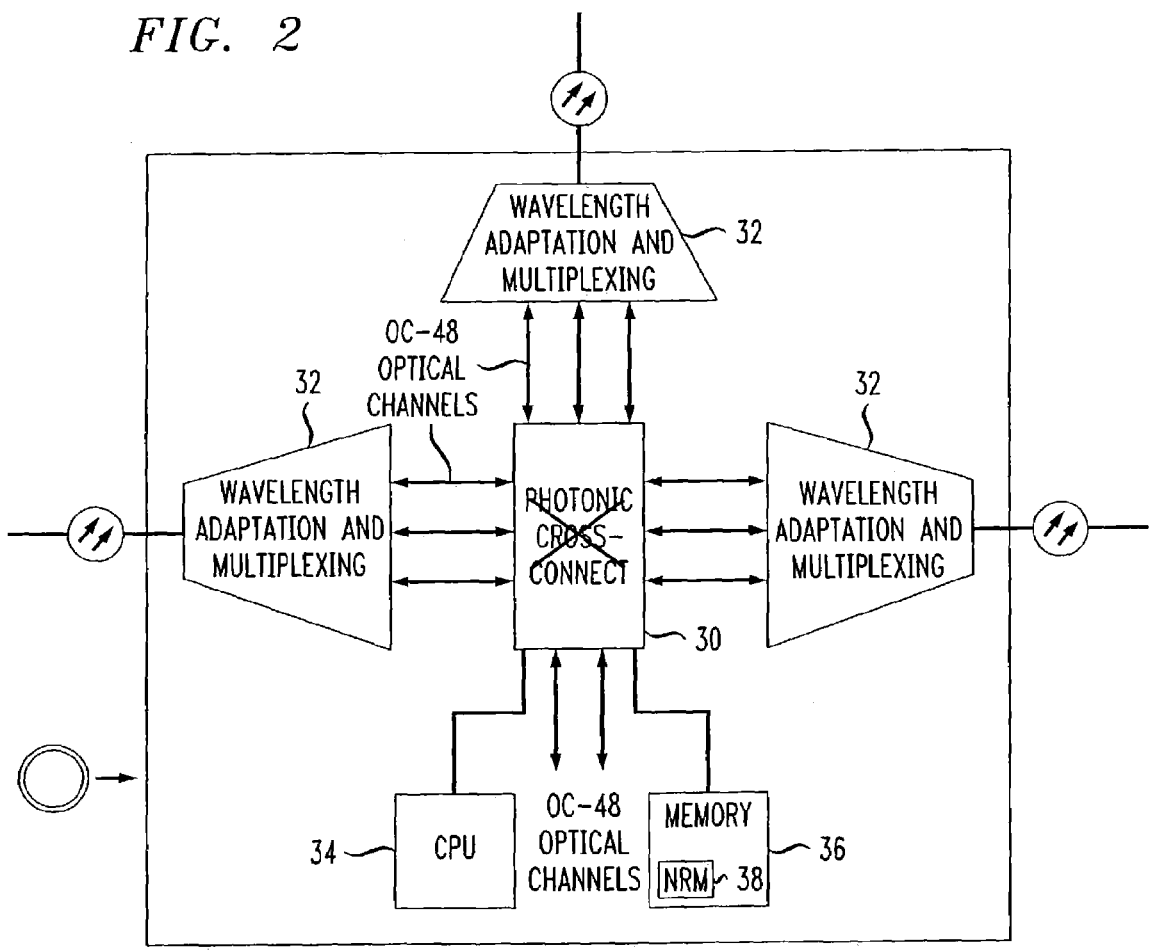
FIG. 2 illustrates an optical cross-connect system suitable for practicing one embodiment of the invention.

FIG. 2 illustrates an optical cross-connect system suitable for practicing one embodiment of the invention. The cross-connect system includes an optical switch fabric 30, multiplexers/demultiplexers (MUX) 32, a central processing unit (CPU) 34, and memory 36. Memory 36 further includes a network restoration module (NRM) 38.

Optical switch fabric 30 performs switching functions by routing a signal from one of its input port to one of its output port. This routing is accomplished regardless of the rate of the signal.

MUX 32 performs wavelength adaptation and multiplexing/demultiplexing functions. With wavelength adaptation and multiplexing, a large number of OC-48 (or any other rate) signals can be transported over a single fiber. Similarly, the reverse function, wavelength de-multiplexing and adaptation, are performed in the receive direction before the OC-48 signals interface with the optical cross-connect system.

It is worthy to note that in this embodiment of the invention, the wavelength adaptation and multiplexing or de-multiplexing functions are shown outside the cross-connect system. It can be appreciated, however, that these functions can be implemented in the photonic cross-connect system itself and still fall within the scope of the invention.

Optical switch fabric 30 is connected to CPU 34. In this embodiment of the invention, CPU 34 is a dedicated processor for optical switch 30, but also may be an external processor. In any event, CPU 34 must have sufficient processing power to perform the functionality for NRM 38.

CPU 34 operates under the control of executed computer program instructions that are stored in memory 36. In this embodiment of the invention, NRM 38 is in the form of computer program instructions stored in memory 36. It can be appreciated, however, that the functionality for NRM 38 may be implemented in hardware, software, or a combination of hardware and software, using well-known signal processing techniques.

Memory 36 may be any type of machine readable storage device, such as random access memory (RAM), read only memory (ROM), programmable read only memory (PROM), erasable programmable read only memory (EPROM), electronically erasable programmable read only memory (EEPROM), magnetic storage media (i.e., a magnetic disk), or optical storage media (i.e., a CD-ROM). Further, the cross-connect system may contain various combinations of machine readable storage devices accessible by CPU 38, and which are capable of storing a combination of computer program instructions and data.

Referring again to FIG. 1, in optical network 8 each pair of nodes is connected by one or more optical links, each link having a pair of fibers for two-way transmission. Although each link is a two-way link, it is not necessary to assume that the traffic is also two-way for the restoration to work.

Optical network 8 is designed in such a way that a majority of the channels in each link carry live traffic and a small number of channels are left vacant to be used for restoration in case of a network failure. To meet a given objective for restoration against failures, a network must be designed properly with respect to the topology and per link usage ratio. Issues associated with the design of such a network has been studied extensively for electronic cross-connect based networks. The same principles can be applied to design an optical network with desired restoration properties in the optical domain.

This embodiment of the invention utilizes three different types of signals that can be transmitted on the optical channels: (1) a service traffic signal (TS); (2) an idle signal (IS); and (3) a restoration signal (RS). The IS is transmitted over the channels not carrying service and are reserved for restoration in case of a failure in the network. The RS is transmitted over the restoration channels when they are to be used for service restoration in case of a failure in the network.

The IS and RS may be any bit pattern, but must be simple enough for the cross-connects to detect, process and insert quickly. In this embodiment of the invention, a repeating sequence of "101010 . . ." bit pattern is used as the IS. The RS is a repeated bit sequence indicating the originating node number associated with a failed link. For other types of restoration, however, a different RS may be necessary. In any event, for any type of restoration, both IS and RS are of an arbitrarily low bit rate and independent of the traffic bit rate. Therefore the capability of timing recovery and detection of IS and RS messages is implemented in the optical domain without the need for optical to electrical conversion, or in the electronic domain with simple circuitry. For example, even though the service channels may carry OC-48 signals which need to be restored on the idle channels, the restoration channels can use a bit rate of only 10 Mb/s or lower for IS and RS.

It is worthy to note that although this embodiment of the invention is illustrated using an optical network, it can be appreciated that this embodiment of the invention is equally applicable to a general network regardless of the types of links and nodes in a network or the types of traffic carried on the links. An advantageous embodiment of the invention, however, provides the most benefit for optical network restoration.

NRM 32 provides network restoration in the event of a link failure or a node failure. If there is a link failure, it is assumed that there is a single link failure, since the probability of another independent link failure in optical network 8 within the restoration period of the first link (sub second) is small. If there is a node failure, however, all links connected to the failed node fail simultaneously.

Since the probability of a node failure is much lower than that of a link failure, NRM 32 first assumes that any failure is a result of a link failure and attempts to restore accordingly. That would result in fast restoration, if indeed it is a link failure. If the failure, on the other hand, is due to a node failure, it will take a longer time to restore the failed channels.

Figure 3:
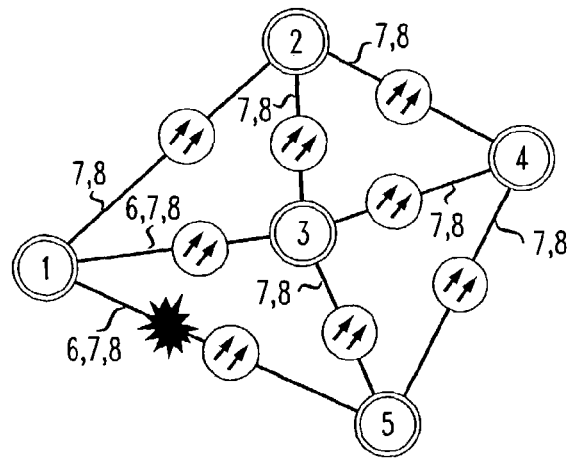
FIG. 3 illustrates a network having a link failure in accordance with one embodiment of the invention.

FIG. 3 illustrates a network having a link failure in accordance with one embodiment of the invention. As shown in FIG. 3 each node in-optical network 8 is assigned a unique number with a predetermined maximum. For illustration purposes only, optical network 8 is assumed to have five nodes, numbered 1 through 5, as shown in FIGS. 1 and 3. Each pair of nodes is connected by an optical link. Further, assume that each link has eight wavelength channels. The channels left vacant for restoration are shown on each link. These channels carry IS in normal condition. FIG. 3 shows a failure in link the link between nodes 1 and 5 ("link 1-5"). Note that as used herein links will be designated by the nodes they connect, with the direction of signals being designated as originating at the first node and terminating at the second node. Thus for link 1-5, signals are originating from node 1 and terminating at node 5. For link 5-1, signals are originating from node 5 and terminating at node 1. When link 1-5 fails, service is restored following the method described with reference to FIG. 4.

Figure 4:
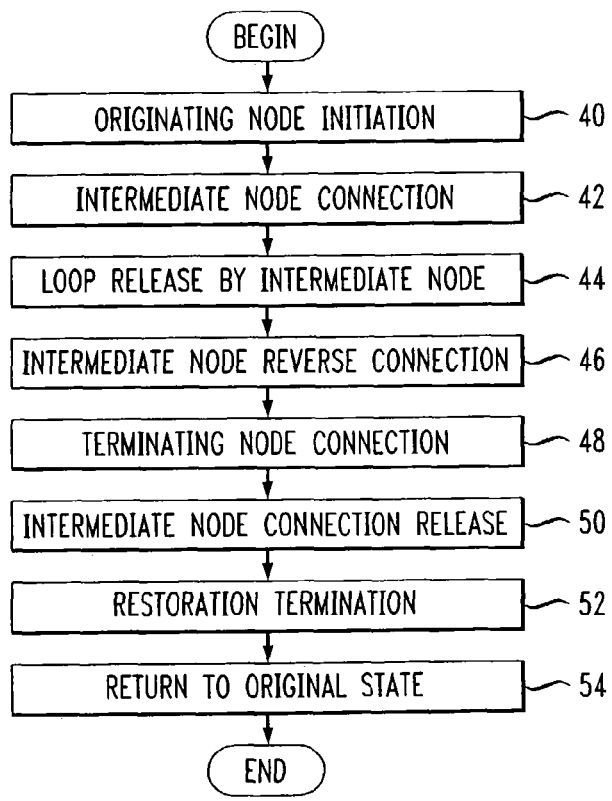
FIG. 4 is a block flow diagram of the steps for restoring a network in the event of a link failure in accordance with one embodiment of the invention.

FIG. 4 is a block flow diagram of the steps for restoring a network in the event of a link failure in accordance with one embodiment of the invention. At step 40, NRM 32 performs initiation for the originating node. Upon detection of failure of one or more channels in one of its links, a node inserts a signal carrying a binary word indicating its own node identification number (NID) to all outgoing healthy restoration channels in all links. The node also sends the failure message to a Network Management System (NMS) (not shown).

It is worthy to note that in one embodiment of the invention NRM 32 runs as individual processes in each node, and therefore does not require a cental controller. In another embodiment of the invention, NMS can be used as a cental controller to facilitate certain functions of NRM 32. In such a case, reference to a NMS will be made where appropriate.

Intermediate node connection is performed at step 42. When an intermediate node, that is not connected to the failed link, detects a change from IS to RS in an incoming restoration channel, it connects the channel to one restoration channel in each outgoing link. If multiple channels in an incoming link change from IS to RS (as in the case of a link failure) then the maximum number of such channels are connected to the restoration channels in each outgoing link. Since there will be, in general, more than one other link, these will be broadcast type connections.

At step 44, the loop release by the intermediate Node is performed. Subsequent to making connections according to step 42 in one direction, when an intermediate node receives another message signal from another link, the node checks if the originating node number in this message signal is identical to that in the first message. If so, the link is released of all connections and IS is inserted in each restoration channel on that link.

An intermediate node reverse connection is made at step 46. After an intermediate node has already made a connection in one direction, when it receives a message signal from an idle channel of another of its incoming links, it checks if the originating node number is different from the one received during its first connection. If the originating node number is different, the intermediate node connects the maximum number of restoration channel carrying RS to the restoration channels in the outgoing direction on the link whose incoming channels were first connected. It is worthy to note that in another embodiment of the invention, the RS may carry both the originating and terminating node IDS. In that case each intermediate node matches both IDs in reverse order for two directions of transmission.

The terminating node connection is performed at step 48. When a node associated with the link failure receives messages carrying another node ID on any incoming restoration channel, it disconnects the input ports from the outgoing channels on the failed link to these restoration channels. Upon completion of the connections, the terminating node inserts IS in place of RS in to all other restoration channels. The terminating nodes then inserts IS to the restored channels on the failed link so that the receiving node is alerted when the link is repaired. As a further confirmation, the terminating nodes may also check the originating node IDs in the incoming RS signals to ensure that they are indeed the nodes at the other ends of the failed link.

The intermediate node releases all connections at step 50. When the signal in any restoration channel is changed from RS to IS, an intermediate node releases all connections to the incoming restoration channel and inserts IS in the outgoing disconnected restoration channels.

NRM 32 terminates network restoration at step 52. Steps 40 through 50 are repeated until one of the following four conditions is satisfied: (1) all failed channels are restored; (2) there is no more restoration channel on any outgoing link; (3) a predetermined time-out period expires and no RS is received in any incoming restoration channel; and (4) the node receives a command from the NMS to halt the process.

At step 54, all operations of optical network 8 are returned to normal. When the failed link is repaired the nodes associated with the failed link receives IS from the repaired link. Then the restored signals are connected to their original ports on the repaired link, the received signals are checked by the receiving nodes for the validity of the signals and then disconnected from the restoration channels. IS is then inserted on the disconnected restoration channels. Upon receiving the IS, the intermediate nodes remove the restoration connections and inserts IS to the outgoing restoration channels. The network then returns to its original state.

If the restoration process is terminated before all failed channels are restored and yet spare channels are available, it is because either the failure is only in the incoming direction (single-ended failure) or it is a node failure or there is no spare capacity between the two nodes. If it is because of single-ended failure, the NMS can detect that from the failure messages sent by the nodes. Then the NMS can command the involved nodes to restore the channel in both directions and the two nodes can then restore the channel following the above rules. Similarly if it is due to node failure, the NMS can detect that from the failure messages from the adjacent nodes and command the involved nodes to begin restoration from a node failure which is discussed next.

The operation of NRM 32 can be better illustrated using the following example, which makes reference to FIG. 3. As shown in FIG. 3, link 1-5 fails. Upon the failure of link 1-5, node 1 continuously transmits the binary word "00000001" to all outgoing idle channels: channels 6, 7 and 8 of link 1-3 and channels 7 and 8 of link 1-2. Specific implementation method of the coding and decoding of the optical message signal RS will be discussed later. On detection of the failure of link 1-5, node 5 also performs the similar functions as node 1 independently.

Upon detection of the change from IS to RS from channels on links 1-3 and 1-2, nodes 2 and 3 read the originating NID (1 in this case) carried on the restoration channels (6, 7 and 8 on link 1-3 and channels 7 and 8 on link 1-2), and connect the incoming restoration channel ports to the outgoing restoration channel ports in all other links. Since there are multiple restoration channels in each link the channels may be connected sequentially. Thus node 2 connects channels 7, 8 from link 1-2 to channels 7, 8 of link 2-3 and also to channels 7 and 8 of link 2-4. Similarly node 3 connects channels 6 and 7 of link 1-3 to channels 7 and 8 of link 3-4, to channels 7 and 8 of link 3-5 and to channels 7 and 8 of link 3-2.

Within a short period of time after node 2 connects restoration channels from link 1-2 to all other outgoing links, it will receive from node 3 on link 3-2 RS with the NID as 1. Upon detecting that the restoration channels 7 and 8 from link 3-2 have the same originating node number as in channels 7, 8 on link 1-2, node 2 releases all connections (channels 7 and 8) to link 2-3 and changes the signal on these channels in link 2-3 to IS. Similarly node 3 releases connections to channels 7 and 8 of link 3-2 and inserts IS.

After node 3 has connected the restoration channels from link 1-3 to link 3-5 and 3-4, at some point of time depending on the link lengths, it will receive either from node 4 or node 5 RS signals on the restoration channels. Assuming that the signal propagation time on link 5-3 is shorter than that on links 5-4 and 4-3 combined, node 3 receives RS from node 5 on the restoration channels 7 and 8 of link 5-3. Noting that the originating node number is now 5, node 3 connects the restoration channels 7 and 8 to the outgoing channels 6 and 7 of link 3-1. Note that node 3 does not connect channels 7 and 8 from link 5-3 to link 3-2 because they are no longer connected in the 2-3 direction.

Upon receiving RS from restoration channels 6 and 7 from link 3-1, node 1 disconnects the input ports from channels 1 and 2 on link 1-5 and connects to channels 6 and 7 on link 1-3. Subsequently, node 1 inserts IS in channels 7 and 8 on link 1-2, in channel 8 of link 1-3 and in channels 1, 2 in link 1-5. Node 5 performs similar functions after it receives RS from link 3-5. Thus channels 1 and 2 on the failed link 1-5 are restored on the path 1-3 (Channels 6 and 7) and 3-5 (Channels 7 and 8).

Node 2 receives IS (changed from RS) in channels 7 and 8 on link 1-2. Node 2 then disconnects channels 7 and 8 on link 2-4 and inserts IS in these channels. This process continues to all the intermediate nodes and all the remaining restoration channels become free.

Nodes 1 and 5 know that they still have to restore channels 3, 4 and 5 on link 1-5. It waits for a predetermined period, say 1 millisecond, and then follows steps 40 through 50 to restore channel 3 on route 1-3 (using channel 8), 3-4 (using channel 7), and 4-5 (using channel 7). In the subsequent attempt, it restores channels 4 of link 1-5 on route 1-2 (using channel 7), 2-4 (using channel 7), 4-5 (using channel 8). Then node 1 attempts to follow steps 40 through 50 again for the remaining channel 5. However, it never receives any RS from the incoming channel 8 on link 2-1 because no more restoration channel is available. Node 1 then terminates any further restoration attempt after a waiting period expires. Node 5 finds that there is no more outgoing restoration channel available in any link. It immediately terminates any further attempt for restoration. Both nodes 1 and 5 communicate with the NMS that it could not restore channel 5 on link 1-5. The NMS attempts to restore service carried on channel 5 in link 1-5 at a lower layer such as SONET layer, Asynchronous Transfer Mode (ATM) layer or electronic cross-connect layer. SONET layer restoration can be either ring restoration or path based restoration. An overall network restoration approach, however, must consider many important issues: network configuration and cost, coordination of restoration among various layers, speed of restoration, and prioritization of restoration of different services/channels.

Nodes 1 and 5 receive IS from channels on link 1-5 when it is repaired. On receiving IS, node 1 and node 5 bridge the corresponding input ports to the service channels 1 through 4 on link 1-5. Nodes 1 and 5 then check for the validity of the received signals in channels 1 to 4 and then disconnect these signals from the restoration channels. It is worthy to note that channel 5 on link 1-5 was never disconnected because it was not restored in the optical layer. Nodes 1 and 5 then insert IS to outgoing restoration channels in links 1-2, 1-3 and 5-3, 5-4. The intermediate nodes 2, 3 and 4 disconnect the restoration channels in the outgoing directions and insert IS.

NRM 32 provides the means of SONET equivalent span protection switching in an optical line. If only one channel in a link fails, then NRM 32 restores the channel on the restoration channel in the same link provided that is the shortest link between the two nodes. With respect to FIG. 3, if any one or more (up to three) channels on link 1-5 fail then they will be restored on channels 6, 7, and 8, provided 1-5 is the shortest path between nodes 1 and 5.

Figure 5:
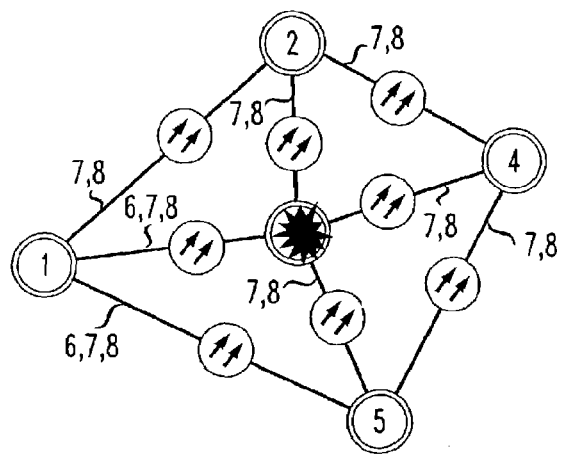
FIG. 5 illustrates a network having a node failure in accordance with one embodiment of the invention.

FIG. 5 illustrates a network having a node failure in accordance with one embodiment of the invention. If there is a node failure in the network, the first attempt to restore a link as described previously will not be successful. When the time-out period is expired or a command is received from the NMS, NRM 32 begins the restoration from a node failure. Note that unsuccessful link restoration attempt could have been due to two or more simultaneous and independent link failures. The probability of another completely independent link failure within the restoration time of the first failed link, however, is extremely small. Simultaneous link failures, on the other hand, is most likely to be associated with a node failure. Therefore, at the end of an unsuccessful link restoration attempt, NRM 32 assumes that the cause of the failure is a node failure and it begins a node restoration process. Alternatively, NRM 32 can wait for commands from the NMS to begin node restoration. The NMS, of course, can detect the node failure without any ambiguity. The steps performed for network restoration in the event of a node failure will be described with reference to FIG. 6.

Figure 6:
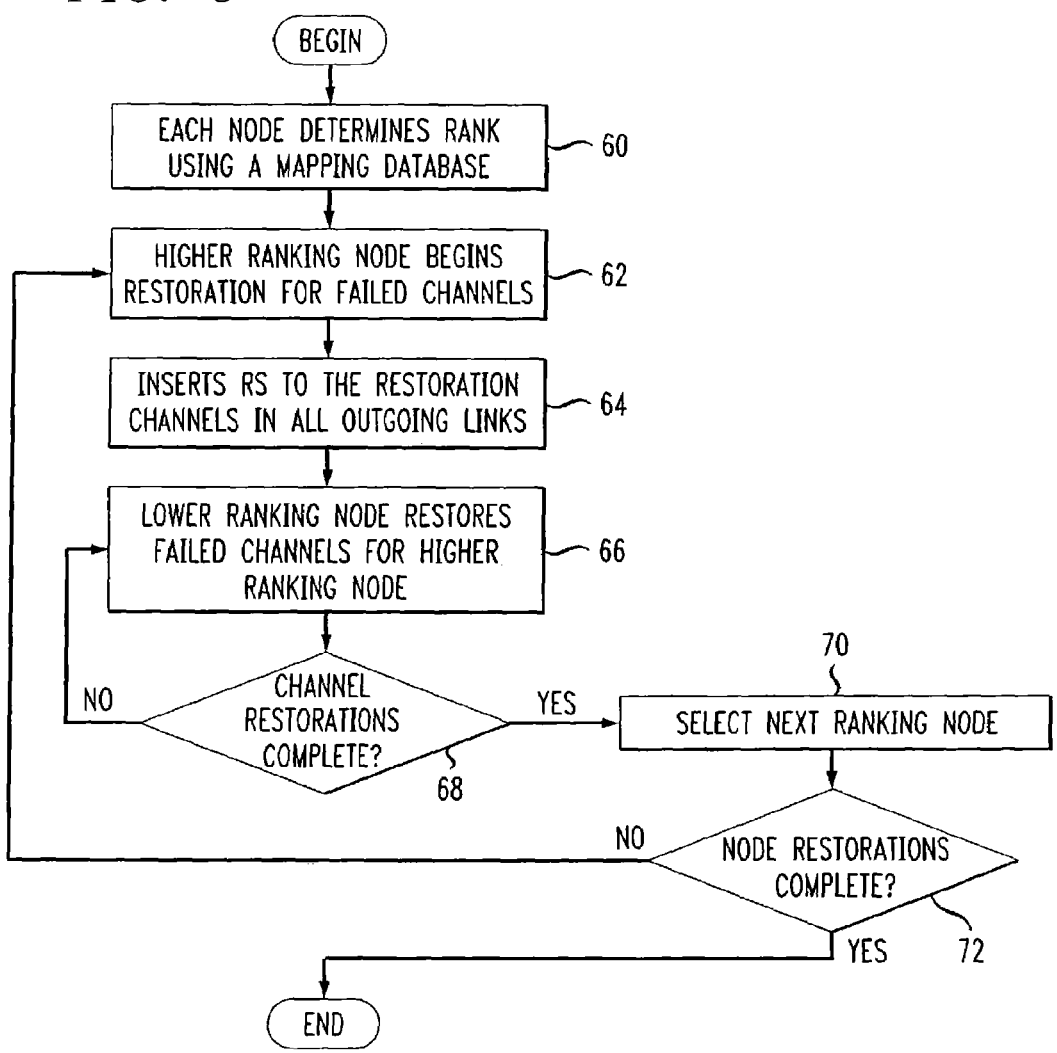
FIG. 6 is a block flow diagram of the steps for restoring a network in the event of a node failure in accordance with one embodiment of the invention.

FIG. 6 is a block flow diagram of the steps performed for restoring a network after a node failure in accordance with one embodiment of the invention. Since a node failure causes multiple link failures, it is now necessary to select and restore the failed channels sequentially to avoid congestion during restoration by flooding method. For that purpose, a connection map of the network is maintained in memory 36 of each cross-connect system. When a node determines that the cause of the failure of its link to another node is the failure of the latter, it looks up the connection map at step 60. From the connection map, each associated node determines its rank relative to the others. For example, the ranks can be assigned with higher to lower as the NID increases.

If the node is of highest rank, it begins restoration of the failed channels on the link to the failed node at step 62. None of the other nodes connected to the failed node originates any restoration attempt.

To consider the restoration against node failure some aspects of the link restoration method need to be modified. To restore a single link failure, it was sufficient that only the originating node ID was transmitted in the RS signal. It is, however, desirable to include in the RS signal both the originating and the target NIDs for confirmation purposes. For restoration from node failure, on the other hand, it is necessary that the RS signals carry both the originating and the terminating node IDs so that the optical paths can be restored around the failed node.

The highest ranking node inserts RS to the restoration channels for all outgoing links at step 64. The highest ranking node selects a failed channel according to some order, which in this embodiment is on the basis of priority. The node then inserts an RS signal, which contains the originating NID (its own ID), terminating NID (the destination NID for the selected channel), to the first restoration channel in each of the outgoing links. If there are additional restoration channels in any outgoing links it selects the next failed channel and inserts an RS (with its NID and the selected channel's destination NID) to the next restoration channel in any outgoing link. The process is continued until all failed channels or all outgoing restoration channels are exhausted. No attempt is made, however, to restore the failed channels which are terminated at the failed node. This can be accomplished by maintaining and consulting a table of terminating NIDs for each channel passing through the cross-connect system in its database.

There is at least one major difference between the single link restoration (SLR) and the single node restoration (SNR) functions of NRM 32. In the case of SLR, each node works independently and simultaneously to restore the failed link. This method leads to a faster restoration. In the case of SNR, however, it is necessary to restore the channels on a failed link only from one node, namely, the higher ranking node to avoid congestion. When the receiving node (e.g., lower rank of the two) detects the RS signal from the higher ranking node, it restores the failed channel whose destination is the higher ranking node at step 66.

After the highest ranking node either completes the restoration of failed channels connected to itself or all outgoing restoration channels are exhausted at step 68, the next highest ranking node is selected at step 70 and begins the restoration of the channels on its failed link. When the second ranking node decides that all failed channels terminated at the highest ranking node are restored or a time-out period expires, it begins restoration of the channels that are terminated to all the lower ranking nodes. Note that none of the nodes will begin any restoration until all the channels that are terminated at a higher ranking node are restored or a time-out period for the node expires. This process continues until all nodes restore their failed channels. If channel restorations are not complete at step 68, steps 66 and 68 are repeated until they are complete. Similarly, if node restorations are not complete at step 72, steps 62 through 72 are repeated until they are also complete.

Network restoration in the event of a node failure can be better illustrated using the following example, which makes reference to FIG. 5. Assume that highest to lowest ranking of the nodes are from 1 to 5. When node 3 fails, each node associated with the failed links attempt to restore the links of course, none will succeed because of no response from node 3. After a time-out period, say, 100 milliseconds, the involved nodes 1, 2, 4 and 5 independently assume that the other end of the links, i.e., node 3 has failed. Node 1 being the highest ranking node, begins restoration of the failed channels. Looking at the destination nodes of the failed channels, it restores the channels between itself and the destination nodes of the individual channels. Node 1, however, does not attempt to restore the channels whose final destination are node 3. In the meantime, nodes 2, 4 and 5 do not attempt to restore any channels yet. Each of these nodes, looking at the network connection map in its own database, determines which are the other affected nodes due to the failure of node 3. For example, node 2 knows that node 3 has failed and nodes 1, 4 and 5 besides itself are connected to node 3. From this list it decides that its rank among the affected nodes is second after node 1. Therefore, it waits for a time-out period. This time-out period can be dependent on whether there is any failed channel between nodes 1 and 2. If there is a channel between nodes 1 and 2 through node 3 that failed, then node 2 waits until all the failed channels between nodes 1 and 2 are restored or all restoration channels are exhausted. On the other hand, if there is no failed channel between nodes 1 and 2, then it can begin restoration of channels to other nodes immediately. Node 2 begins restoration of any failed channels between itself and the affected lower ranking nodes 4 and 5. Nodes 4 and 5 still wait for the node 2 to complete its restoration attempt in a similar manner. This process is continued until the last but one node (node 4). Depending on the available restoration channels, some or all failed channels will be eventually restored. Note that the restoration from a node failure will take longer time (of the order of 0.5 to 1 second) because simultaneous restoration attempts between multiple pairs of nodes may interfere with each other leading to higher probability of failed attempts. The probability of congestion is minimized in the proposed method at the expense of longer restoration time for the less likely case of a node failure.

Figure 7:
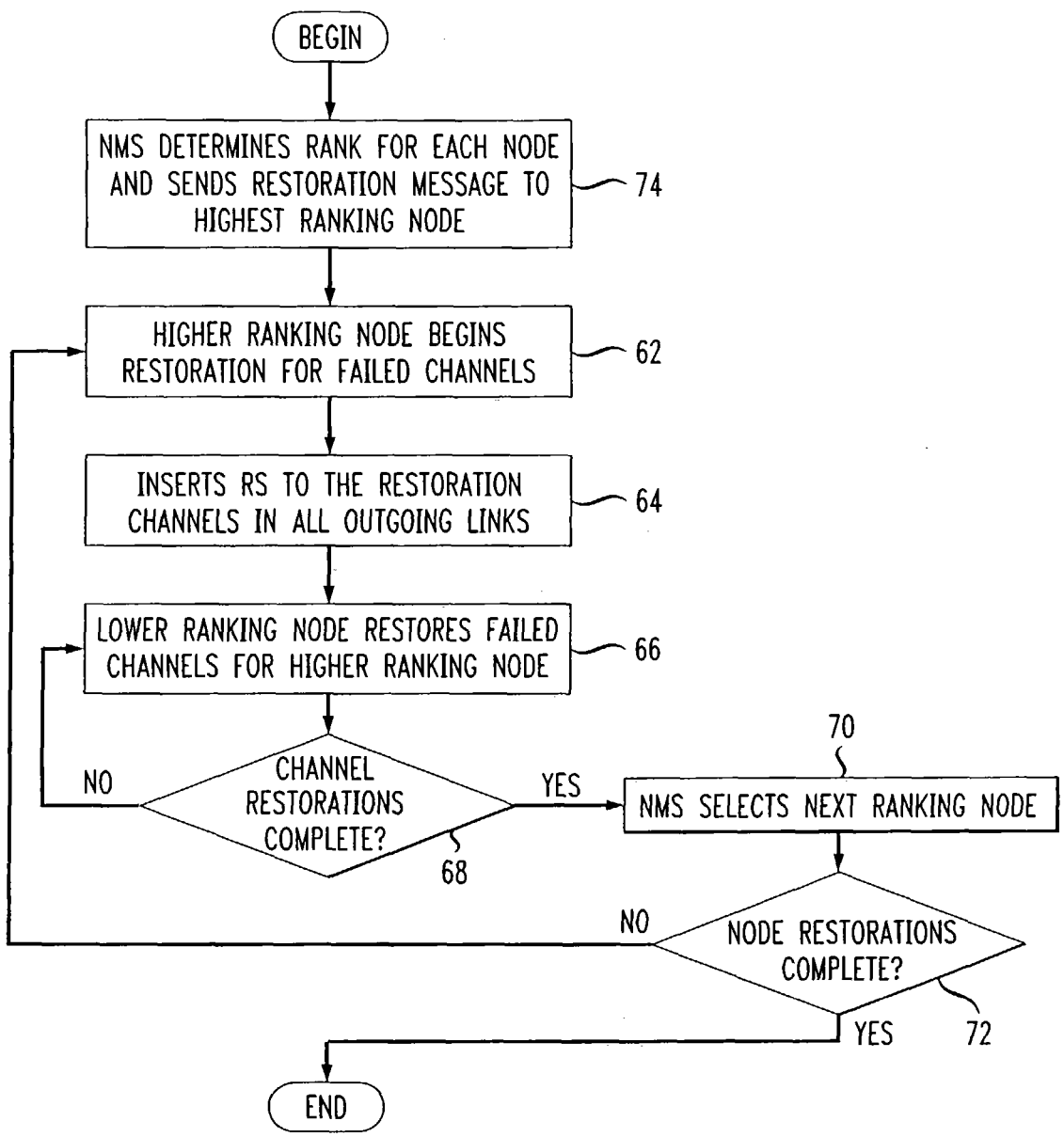
FIG. 7 is a block flow diagram of the steps for restoring a network in the event of a node failure in accordance with another embodiment of the invention.

FIG. 7 is a block flow diagram of the steps performed for restoring a network in the event of a node failure in accordance with another embodiment of the invention. In this embodiment of the invention, steps 62 through 72 are similar to the steps described with reference to FIG. 6. In FIG. 7, however, the prioritization of nodes can be done by the NMS at step 74, rather than by the nodes themselves. In this case, the NMS will command the pairs of nodes to restore specific channels sequentially. The NMS can receive confirmation from the pairs of nodes before issuing another restoration command to avoid congestion in the restoration process.

NRM 32 is applicable for restoration of a failed link or a failed node around the nodes adjacent to the failure location. This is essentially a link based restoration. NRM 32, however, can perform path based restoration which provides more efficient utilization of restoration capacity at the expense of restoration speed. The speed is compromised for several reasons: (1) the restoration cannot begin until the path terminating node receives the path AIS (Alarm Indication Signal) from the nodes adjacent to the failure location; (2) more intermediate nodes are involved for a path restoration compared to link restoration; and (3) every pair of nodes for each failed path will simultaneously attempt to capture restoration capacity which may lead to conflict and its resolution may take longer time. Considering the conflict resolution difficulties and restoration speed, link based restoration is considered to be the more advantageous embodiment of the invention even though the path based restoration is more capacity efficient. This determination, however, is contingent upon the type of network and desired performance parameters, and is in this respect application specific.

The cross-connect systems must be able to detect the change of state of each of the incoming channels. As mentioned earlier, significant simplification can be achieved by making the IS and the RS independent of the rate of the TSs. As an example, the IS can be a "101010 . . . " pattern. The RS, on the other hand, will carry the originating node ID and the terminating node ID. Therefore, the signal can be generated as a framing pattern appended with two ID numbers of the originating and terminating nodes.

Figure 8:
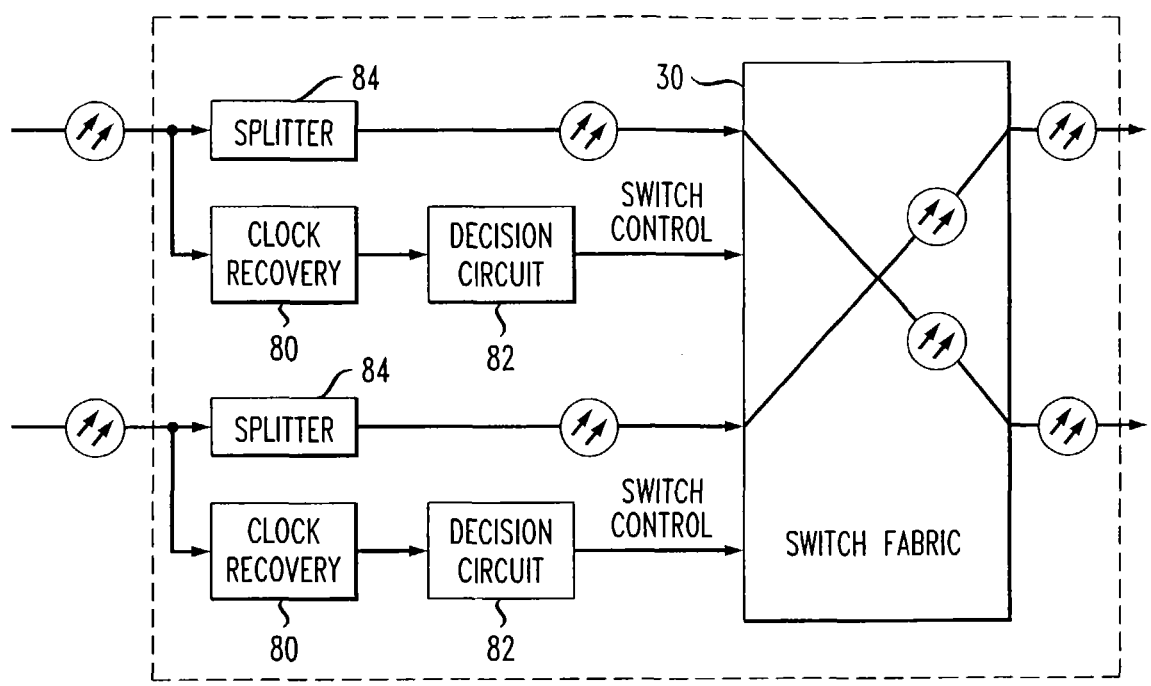
FIG. 8 illustrates a block diagram of a detecting circuit in accordance with one embodiment of the invention.

FIG. 8 illustrates a block diagram of a detecting circuit in accordance with one embodiment of the invention. Each input port for the detecting circuit has a splitter 84, a clock recovery circuit 80, and a decision circuit 82. The output for decision circuits 82 are sent to input ports for optical switch fabric 30.

As shown in FIG. 8, each signal is fed to a clock recovery circuit 80 and a decision circuit 82. The change in the state of the signal type is decided by decision circuits 82 and a control signal is generated to control the switching state of the switch fabric. The IS and RS bit rates should be identical so that the decision circuit can recognize the state change from the IS to RS quickly. Since the TS and RS may be of different bit rates, the timing recovery circuit may take longer to recover clock and hence to recognize the state change from TS to IS. However, this state change recognition need not be fast.

The restoration time depends on the number of channels to be restored, number of restoration channels available in the alternate routes, the link lengths, and to a less extent on the bit rate of the RS signal. An estimate for the restoration time is given by the following equation:

$$T_r = \frac{Nl}{c}(N+3) + t_p N(N+5) + Nt_w$$

where, N=Ceiling [f/(1−f)], the number of attempts required to restore all channels in a failed link, f=Fraction of the channels in each link used for normal traffic (1−f is the fraction of the channels in each link available for restoration), l=Average link length, c=Speed of light in fiber, $t_p$=Processing time at each node which includes the time to detect change in signal type and to set up or remove channel connections, and tw=Waiting period between two attempts for restoration.

Using this equation, a typical restoration time can be estimated as follows. Assume that each link has 16 channels of which 12 are used for normal traffic and 4 channels are available for restoration. All channels are restored in three attempts. Because of the simplicity of the RS signal, even with a low bit rate such as 10 Mb/s, a processing time of 0.5 millisecond should be sufficient. If 8 bits are reserved for each the originating node ID, terminating node ID, and framing, then within a period of 0.5 millisecond, there are 208 frames to detect and confirm the simple repeated message. Another 0.5 millisecond should be sufficient for connecting or disconnecting the channels. Therefore, 1 millisecond for tp is a conservative estimate. An estimate of 1 millisecond for tw is also conservative. With these numbers, the restoration time for a link failure is conservatively estimated to be 68 milliseconds. Out of the 68 milliseconds, the signal propagation time of 28 milliseconds is fixed. However, it is possible to reduce the processing time. If it is reduced to 0.5 millisecond, for example, the total restoration time is less than 50 milliseconds.

The restoration from node failure however, will take longer. It will vary depending on the connectivity of the network. If the degree of the failed node in a network is four or five, a restoration time of less than 500 milliseconds can be achieved.

Although various embodiments are specifically illustrated and described herein, it will be appreciated that modifications and variations of the present invention are covered by the above teachings and within the purview of the appended claims without departing from the spirit and intended scope of the invention. For example, although the method and apparatus described above uses a link based approach, the method and apparatus can be modified to apply in the case of path based restoration as well and still fall within the scope of the invention. In another example, although the various embodiments of the invention utilize optical cross-connects, it can be appreciated that electrical cross-connects fall within the scope of the invention as well.

What is claimed is:

1. A method for restoring communications in a network, the network having a plurality of nodes, with each pair of nodes connected by a link, with each link having information channels and restoration channels, comprising the steps of:

sending an idle signal on each restoration channel for each link;

detecting a failure of a link connecting an originating node with a terminating node, said link having at least one information channel carrying information signals;

determining an alternate path through the network for said information signals using restoration and idle signals sent over said restoration channels; and routing said information signals from said originating node to said terminating node in accordance with said alternate path.

2. The method of claim 1, wherein said step for determining said alternate path comprises the steps of:

sending a restoration signal having a node identification number for said originating node in a restoration channel for each link connected to said originating node;

sending a restoration signal having a node identification number for said terminating node in a restoration channel for each link connected to said terminating node; and routing said restoration signals through alternate links and at least one intermediate node until said restoration signal having a node identification number for said originating node reaches said terminating node, and said restoration signal having a node identification number for said terminating node reaches said originating node.

3. The method of claim 2, wherein said step of routing said restoration signals through said intermediate node comprises the steps of:

a) receiving a first restoration signal over a first restoration channel for a first link at said intermediate node;

b) sending said first restoration signal over a restoration channel for each link connected to said intermediate node except for said first restoration channel;

c) receiving a second restoration signal over a second restoration channel for a second link at said intermediate node;

d) determining whether said node identification number for said first restoration signal matches a said node identification number for said second restoration signal;

e) sending an idle signal over said second restoration channel if said NIDs match;

f) sending said second restoration signal over said first restoration channel if said NIDs do not match; and g) performing steps a) to f) for each intermediate node receiving a restoration signal.

4. The method of claim 3, further comprising the steps of:

a) receiving a first idle signal over a restoration channel for a link connected to said intermediate node;

b) sending a second idle signal over said restoration channel over which said first idle signal was received; and c) performing steps a) and b) for each intermediate node receiving an idle signal.

5. The method of claim 4, further comprising the step of:

a) receiving said restoration signal having a node identification number for said originating node over a link other than said failed link connected to said terminating node;

b) disconnecting inputs for receiving said information signals from said failed links;

c) connecting said inputs for receiving said information signals to said link over which said restoration signal was received by said terminating node; and d) sending an idle signal in all links connected to said terminating node except for said link over which said restoration signal was received by said terminating node.

6. The method of claim 5, further comprising the step of:

a) receiving said restoration signal having a node identification number for said terminating node over a link other than said failed link connected to said originating node;

b) disconnecting inputs for sending said information signals over said failed links;

c) connecting said inputs for sending said information signals to said link over which said restoration signal was received by said originating node; and d) sending an idle signal in all links connected to said originating node except for said link over which said restoration signal was received by said originating node.

7. The method of claim 6, wherein said step for determining said alternate path is executed until at least one terminating condition is fulfilled from a group comprising: (1) all failed channels are restored; (2) there are no more available restoration channels on any link connected to one of said originating node and terminating node; (3) a predetermined delay period expires and a restoration signal is not received by one of said originating node and terminating node; and (4) a node receives a command from a central controller to halt restoration.

8. The method of claim 7, wherein said failed link has multiple information channels, further comprising the steps of:

determining an alternate path through the network for information signals from each failed information channel using restoration and idle signals sent over available restoration channels for each link connected to said originating node;

routing said information signals from said originating node to said terminating node in accordance with said alternate paths.

9. The method of claim 8, further comprising the steps of:

repairing said failed link;

receiving an idle signal at said originating node and said terminating node over said restoration channels for said repaired link;

routing said information signals for said failed information channels from said alternate path of links and at least one intermediate node to said repaired information channels;

sending an idle signal over said restoration channels for said alternate path of links and at least one intermediate node.

10. A method for restoring communications in a network, the network having a plurality of nodes, with each pair of nodes connected by a link, with each link having information channels and restoration channels, comprising the steps of:

sending an idle signal on each restoration channel for each link;

detecting a failure of an intermediate node between an originating node and a terminating node, said intermediate node switching information signals carried by at least one information channel for a plurality of links terminating at said intermediate node and carrying information signals from said originating node to said terminating node;

determining an alternate path through the network around said failed node using restoration and idle signals sent over restoration channels for links not terminating at said failed node; and routing said information signals from said originating node to said terminating node in accordance with said alternate path.

11. The method of claim 10, wherein said step for determining comprises the steps of:

identifying information channels for nodes having links terminating at said failed node;

ranking said nodes using a connection map;

sequentially restoring said information channels for nodes having links terminating at said failed node according to said rankings until all said information channels are restored.

* * * * *